D. HALL.
REGULATING MEANS FOR DYNAMO ELECTRIC MACHINERY.
APPLICATION FILED OCT. 6, 1916.

1,293,764. Patented Feb. 11, 1919.

WITNESSES:
R.J. Fitzgerald
D.C. Davis

INVENTOR
David Hall.
BY
Wesley G. Carr
ATTORNEY

UNITED STATES PATENT OFFICE.

DAVID HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

REGULATING MEANS FOR DYNAMO-ELECTRIC MACHINERY.

1,293,764.          Specification of Letters Patent.          Patented Feb. 11, 1919.

Application filed October 6, 1916.   Serial No. 124,040.

*To all whom it may concern:*

Be it known that I, DAVID HALL, a citizen of the United States, and a resident of Wilkinsburg, in the county of Allegheny and State of Pennsylvania, have invented a new and useful Improvement in Regulating Means for Dynamo-Electric Machinery, of which the following is a specification.

My invention relates to commutating means for dynamo-electric machinery, and it has for its object to provide apparatus of the character designated wherewith a marked demagnetizing effect may be obtained from the armature winding of a dynamo-electric machine and, at the same time, a suitable stator commutating field may be provided for insuring proper commutation.

Figure 1:
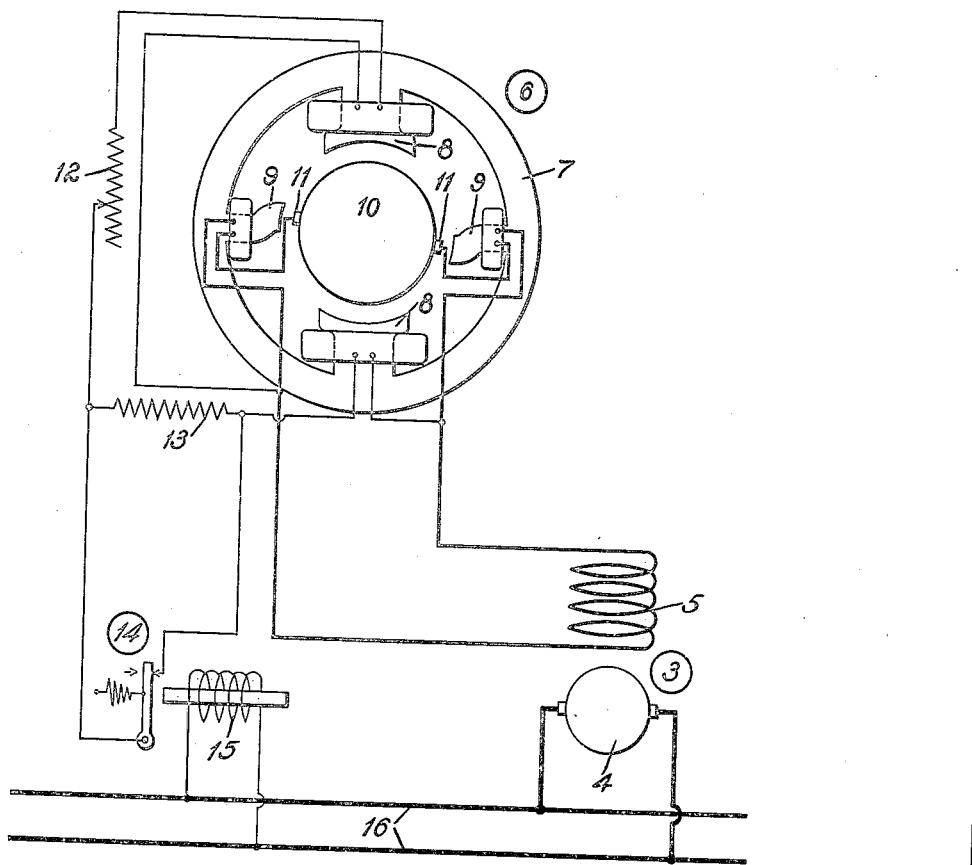
Figure 2:
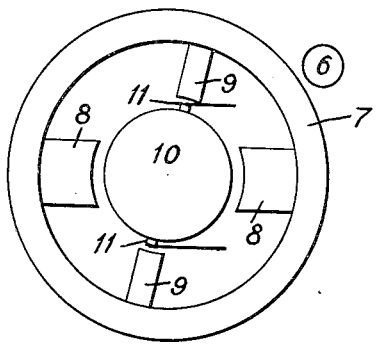

In the accompanying drawing, Figure 1 is a diagrammatic view of a dynamo-electric machine, together with certain auxiliary apparatus and circuits, illustrating a preferred form of my invention, and Fig. 2 is a diagrammatic view of a modification of the machine shown in Fig. 1.

In the operation of generating stations, it is usual to excite the main generators from special exciting machines and to adjust the voltage supplied by said exciting machines in accordance with the load on the main generators by means of Tirrill regulators or similar apparatus, usually associated with the exciting field circuit of the exciter machines themselves. It is desirable, in order to obtain good voltage regulation on the outgoing mains that the regulator and the exciting machines follow very closely the load changes.

It is usual to employ small generators of the interpole type as exciter machines and, in this form of apparatus, the brushes are generally placed on the neutral point. In consequence, there are no demagnetizing turns in the armature winding and when the regulator attempts to reduce the voltage of the exciter machine, the response of the latter is sluggish because of the absence of any force tending to reduce the working flux.

By my invention, I provide an interpole machine, preferably of standard form, with special interpoles having off-set tips so that the stator commutating magneto-motive force is applied a short distance from the neutral point and I further place the brushes under the center of the interpolar tips so that they have sufficient displacement to provide de-magnetizing turns in the armature winding, and, at the same time, produce good commutation. In this manner, a positive demagnetizing effect is embodied in the machine and, consequently, the operation thereof follows the regulator closely, both in building up and in building down the voltage as is desired.

Referring to the drawing for a more detailed understanding of my invention, I show a main generator at 3 in Fig. 1, said machine comprising an armature 4 and an exciting field winding 5. The machine 3 is shown as of the direct-current type but it may equally well be an alternator, if desired.

Energization for the exciting field winding 5 is derived from an exciter machine 6 comprising a stator 7 supporting main poles 8—8 and interpoles 9—9 and further comprising an armature 10 provided with a commutator cylinder upon which bear brushes 11—11. The interpoles 9—9 are attached to the frame of the machine midway between the main poles 8—8, thus permitting the use of a standard frame, but the tips of said interpoles are off-set in the direction of rotation so that the commutating field produced thereby is slightly displaced from the true neutral position. The brushes 11—11 are centrally disposed in the commutating zones, thus established and, therefore, produce demagnetizing turns in the armature winding, as is well understood in the art.

The interpoles 9—9 are excited by series-connected windings and the main poles 8—8 are excited by shunt-connected windings, current for which flows through a field rheostat 12 of any desired form and also through the resistor 13 of a Tirrill regulator 14, the operating winding 15 of which is connected across mains 16 connected to be energized from the main generator 3.

The operation of the system described needs but little further explanation. Upon a decrease in the load of the main machine 3, the Tirrill regulator 14 operates to reduce the excitation provided by the machine 6. The demagnetizing armature turns immediately force down the field flux, causing a quick response of the field 5 to the regulating action and consequent good operation in voltage regulation and in paralleling of the main generator.

In the form of machine shown in Fig. 2, the interpoles are of the usual straight type and are attached to the frame of the machine unsymmetrically with respect to the main poles 8—8, the brushes 11—11 being disposed thereunder as in the machine of Fig. 1. While the machine thus disclosed in Fig. 2 is obviously operative in the same manner as the machine shown in Fig. 1, it requires a special frame drilling for the proper support of the interpoles and the field coil spaces between adjacent poles become unequal.

While I have shown my invention in its preferred form, it will be obvious to those skilled in the art that it is susceptible of various minor changes and modifications without departing from the spirit thereof and I desire, therefore, that only such limitations shall be placed thereupon as are imposed by the prior art or as are set forth in the appended claims.

I claim as my invention:

1. The combination with a dynamo-electric machine of the commutator type provided with commutating field windings, of means for, at times, abruptly reducing the excitation thereof in order to reduce the output voltage, the brushes and commutating field zones of said machine being so disposed as to provide demagnetizing turns in the armature winding, whereby the response of said machine to said field alteration is rendered substantially instantaneous.

2. The combination with a dynamo-electric machine of the commutator type provided with commutating field windings, of means for, at times abruptly reducing the excitation thereof in order to reduce the output voltage, the brushes and commutating field zones of said machine being given a forward lead, whereby a portion of the armature winding is caused to act as demagnetizing turns and the response of said machine to said field alteration is rendered substantially instantaneous.

3. The combination with an exciter machine of the commutator type provided with commutating poles, of an automatic voltage regulator operable to vary the excitation thereof, the brushes and commutating field zones of said machine being so disposed as to provide demagnetizing turns in the armature winding, whereby the response of said machine to said regulating apparatus is rendered substantially instantaneous.

4. The combination with an exciter machine of the commutator type provided with commutating poles, of an automatic voltage regulator operable to vary the excitation thereof, the brushes and commutating zones of said machine being given a forward lead, whereby a portion of the armature winding is caused to act as demagnetizing turns and the response of said machine to said regulating apparatus is rendered substantially instantaneous.

In testimony whereof, I have hereunto subscribed my name this 29th day of Sept. 1916.

DAVID HALL.